United States Patent
Hu et al.

(10) Patent No.: US 11,639,051 B2
(45) Date of Patent: May 2, 2023

(54) PRESSURIZED REDUCTION OF CNT RESISTIVITY

(71) Applicant: Goodrich Corporation, Charlotte, NC (US)

(72) Inventors: Jin Hu, Hudson, OH (US); Galdemir Cezar Botura, Akron, OH (US); Casey Slane, Richwood, OH (US); Nathaniel Ching, Uniontown, OH (US)

(73) Assignee: Goodrich Corporation, Charlotte, NC (US)

( * ) Notice: Subject to any disclaimer, the term of this patent is extended or adjusted under 35 U.S.C. 154(b) by 71 days.

(21) Appl. No.: 17/087,972

(22) Filed: Nov. 3, 2020

(65) Prior Publication Data

US 2021/0316543 A1 Oct. 14, 2021

Related U.S. Application Data

(63) Continuation-in-part of application No. 15/373,370, filed on Dec. 8, 2016, now abandoned.

(51) Int. Cl.
*B32B 37/10* (2006.01)
*D04H 1/4242* (2012.01)
(Continued)

(52) U.S. Cl.
CPC .............. *B32B 37/10* (2013.01); *B32B 37/12* (2013.01); *D04H 1/4242* (2013.01); *D06C 7/00* (2013.01);
(Continued)

(58) Field of Classification Search
CPC ......... B32B 37/10; B32B 37/12; B32B 15/14; B32B 15/20; B32B 2262/101; B32B 2262/106; B32B 2305/20; B32B 2307/202; B32B 2250/03; B32B 2255/06; B32B 2260/046; B32B 2307/7244;
(Continued)

(56) References Cited

U.S. PATENT DOCUMENTS 8,080,199 B2 * 12/2011 Tour ........................ C04B 35/80
204/157.43
2003/0198812 A1 10/2003 Rueckes et al.
(Continued)

FOREIGN PATENT DOCUMENTS

EP 2289803 A2 3/2011
WO WO2016126827 A1 8/2016

OTHER PUBLICATIONS

Marinho etc. "Electrical conductivity of compacts of graphene, multi-wall carbon nanotubes, carbon black, and graphite powder." Powder Technology 221 (2012): 351-358., retrieved on May 7, 2019 https://www.sciencedirect.com/science/article/pii/S0032591012000277 (Year: 2012).*

(Continued)

*Primary Examiner* — Francisco W Tschen
*Assistant Examiner* — Abhishek A Patwardhan
(74) *Attorney, Agent, or Firm* — Kinney & Lange, P.A.

(57) ABSTRACT

A method for reducing the resistivity of a carbon nanotube nonwoven sheet includes providing a carbon nanotube nonwoven sheet comprising a plurality of carbon nanotubes and applying pressure to the carbon nanotube nonwoven sheet to reduce air voids between carbon nanotubes within the carbon nanotube nonwoven sheet.

11 Claims, 2 Drawing Sheets

(51) Int. Cl.
  D06C 7/00     (2006.01)
  D06C 15/00    (2006.01)
  B32B 37/12    (2006.01)
  B32B 15/20    (2006.01)
  B32B 15/14    (2006.01)
(52) U.S. Cl.
  CPC .............. *D06C 15/00* (2013.01); *B32B 15/14* (2013.01); *B32B 15/20* (2013.01); *B32B 2262/101* (2013.01); *B32B 2262/106* (2013.01); *B32B 2305/20* (2013.01); *B32B 2307/202* (2013.01); *D10B 2101/122* (2013.01)
(58) Field of Classification Search
  CPC . B32B 2605/18; B32B 5/022; B32B 2255/26; B32B 2260/021; B32B 2307/20; B32B 2307/732; B32B 5/147; B32B 5/26; B32B 7/12; D04H 1/4242; D06C 7/00; D06C 15/00; D06C 15/02; D10B 2101/122; B64C 2027/4736; B82Y 40/00; B82Y 30/00; B64D 15/12
  USPC ........................................................ 156/222
  See application file for complete search history.

(56) References Cited

U.S. PATENT DOCUMENTS

| | | |
|---|---|---|
| 2009/0140098 A1 | 6/2009 | Lengsfeld et al. |
| 2010/0176118 A1 | 7/2010 | Lee et al. |
| 2010/0259867 A1* | 10/2010 | Machida ................ H01G 11/74 156/151 |
| 2010/0279569 A1* | 11/2010 | Shah ...................... C03C 25/12 87/8 |
| 2012/0118868 A1* | 5/2012 | Kim ...................... B82Y 30/00 977/902 |
| 2013/0157001 A1 | 6/2013 | Knoff et al. |
| 2013/0264116 A1 | 10/2013 | Lashmore et al. |
| 2014/0034633 A1* | 2/2014 | Heintz .................. H01C 17/06 219/525 |

OTHER PUBLICATIONS

Noh etc. "Improved Electrical Conductivity of Carbon Nanotube Mat Composite Prepared By In-Situ Polymerization.", 2012, retrieved on May 7, 2019 from http://confsys.encs.concordia.ca/ICCM19/AllPapers/FinalVersion/KIM80249.pdf (Year: 2012).*

First Brazilian Office Action for BR Application No. BR102017024020, dated Apr. 13, 2021, pp. 6.

Marinho et al. "Electrical conductivity of compacts of graphene, multi-wall carbon nanotubes, carbon black, and graphite powder." Power Technology 221 (2012): 351-358., retrieved on May 7, 2019 https://www.sciencedirect.com/science/article/pii/S0032591012000277 (Year: 2012).

Second Brazilian Office Action for BR Application No. BR102017024020-7, dated Aug. 1, 2022, pp. 7.

* cited by examiner

PRESSURIZED REDUCTION OF CNT RESISTIVITY

CROSS-REFERENCE TO RELATED APPLICATION(S)

This application is a continuation-in-part of U.S. application Ser. No. 15/373,370 filed Dec. 8, 2016 for "Pressurized Reduction Of CNT Resistivity" by J. Hu, G. C. Botura, C. Slane, N. Ching.

BACKGROUND

Carbon nanotubes (CNTs) are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. This makes the use of CNTs of particular interest for applications where weight is critical, such as in aerospace and aviation technologies.

Carbon nanotubes are commercially available in several different forms. One such form is as a pure carbon nanotube nonwoven sheet material (CNT-NSM). In a CNT-NSM, carbon nanotubes are arranged together to form a sheet. No adhesives or polymers are used to attach CNTs to one another in a CNT-NSM. Instead, CNT particles are attached to one another via Van der Waals forces. However, the electrical conductivity of these commercially available, off-the-shelf CNT-NSMs is generally in the range of 350-400 Siemens/cm or lower. This level of electrical conductivity is not suitable for many aerospace heating applications (e.g., anti-icing and de-icing). Thus, commercially available CNT-NSMs cannot currently be used as a substitute for metal heating elements.

SUMMARY

A method for reducing the resistivity of a carbon nanotube nonwoven sheet includes providing a carbon nanotube nonwoven sheet comprising a plurality of carbon nanotubes and applying pressure to the carbon nanotube nonwoven sheet to reduce air voids between carbon nanotubes within the carbon nanotube nonwoven sheet.

DETAILED DESCRIPTION

This disclosure provides methods for reducing the resistivity of a carbon nanotube (CNT) nonwoven sheet material (CNT-NSM). The resistivity of a CNT-NSM is reduced by removing air voids between CNTs within the CNT-NSM. Air voids are removed from the CNT-NSM by the application of pressure to the CNT-NSM. The disclosed methods allow for the improvement of CNT heating elements without the addition of mass or the addition of functional groups using chemical processes.

Figure 1:
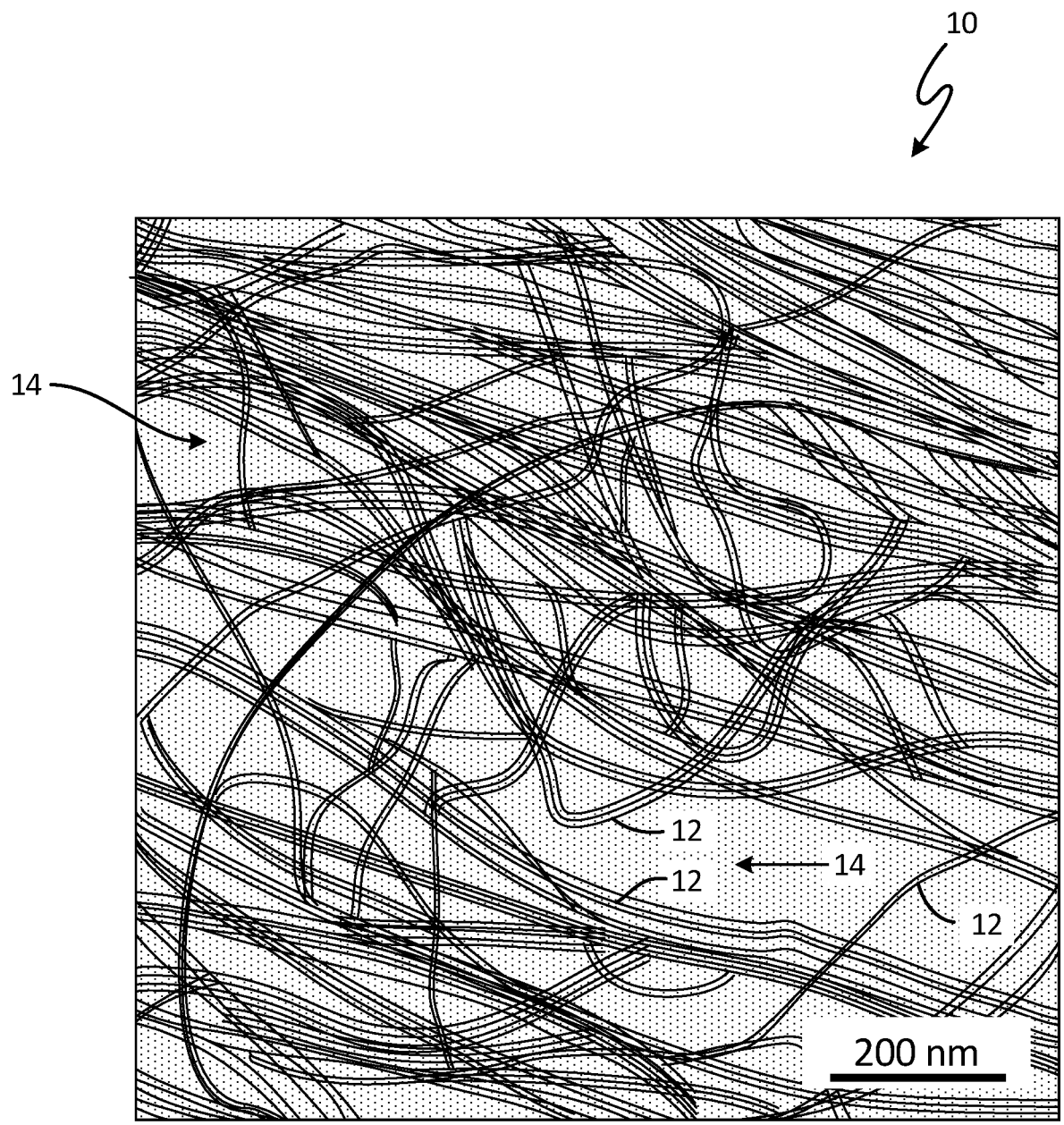
FIG. 1 is a schematic view of a magnified portion of a carbon nanotube nonwoven sheet material (CNT-NSM).

FIG. 1 schematically illustrates one example of a portion of a carbon nanotube nonwoven sheet. CNT nonwoven sheet 10 includes a plurality of carbon nanotubes (CNTs) 12 that are attached together to form sheet 10. CNT nonwoven sheet 10 is generally manufactured as a flat sheet or tape that is very thin, as thin as or thinner than the thickness of an ordinary sheet of paper (about 0.07 to 0.18 millimeters). The length and width of sheet 10 can vary depending on manufacturer or customer selection. For example, CNT nonwoven sheets are available from Nanocomp Technologies, Inc./Huntsman Advanced Materials of Merrimack, N.H. under the Miralon® brand. FIG. 1 schematically illustrates a magnified view of sheet 10 to illustrate individual CNTs 12.

In some embodiments, CNT nonwoven sheet 10 includes only carbon nanotubes 12 and sheet 10 is free of the adhesives, resins and polymers that are often used as a matrix that incorporate CNT particles. In these cases of pure CNT-NSMs, CNTs 12 are held together by Van der Waals forces or interactions. Van der Waals forces are non-covalent and non-ionic attractive forces between CNTs caused by fluctuating polarizations of the CNTs. Individual carbon nanotubes 12 can align themselves by pi-stacking, one type of Van der Waal interaction. Pi-stacking refers to attractive, non-covalent interactions between aromatic rings that occur due to the presence of pi bonds. As each carbon ring within a CNT possesses pi bonds, pi-stacking occurs between nearby CNTs 12. As pure CNT-NSMs (such as sheet 10) do not contain adhesives, resins and polymers, they are sometimes referred to as "dry" sheets.

As shown in FIG. 1, air voids 14 are present between some adjacent CNTs 12. Air voids 14 present in sheet 10 increase the resistivity (and reduce the conductivity, which is inversely proportional to the resistivity) of sheet 10. Air voids 14 are present in commercially available CNT-NSMs to such an extent that they increase the resistivity of sheet 10 and render them unsuitable for many anti-icing and de-icing applications on aircraft. For example, the lowest claimed resistivity of one commercially available, off-the-shelf CNT-NSM is about 0.4 ohms per square ($\Omega/sq$)[1]. For some aircraft components, such as rotor blades, the resistivity of a heating element should be 0.1 $\Omega/sq$ or lower to provide sufficient anti-icing and/or de-icing. As disclosed herein, pressure is applied to commercially available CNT-NSMs to remove air voids 14 present in sheet 10 to decrease the resistivity of sheet 10. The application of pressure makes sheet 10 suitable for additional heating applications for which untreated CNT-NSMs are not.

[1] As known in the industry, the unit of measure for resistivity of a thin film material measured using a four point probe technique is ohms-per-square. The measured result is equal to the resistance between two electrodes on opposite sides of a theoretical square. The size of the square is unimportant.

Pressure can be applied to CNT nonwoven sheet 10 using different methods. In one embodiment, pressure is applied to sheet 10 using a machine press. The machine press can include two opposing plates that are pressed together with sheet 10 positioned between the two plates. As pressure is applied to sheet 10 by the plates, the size and/or number of air voids 14 present within sheet 10 are reduced. Reducing the size and number of air voids 14 in sheet 10 allows CNTs 12 within sheet 10 to be positioned closer together, thereby reducing the resistivity of sheet 10. The amount of pressure applied to sheet 10 by the plates can vary depending on the amount of air voids 14 present in sheet 10 and the amount of air voids 14 desired in sheet 10 after pressing. In some embodiments, the applied pressure can be up to about 689 kPa (100 psig) or higher. For example, in some embodiments, the applied pressure can be about 571 kPa (75 psig).

In theory, the applied pressure can be as high as possible as long as air voids 14 are being reduced in size and/or number and significant damage to sheet 10 is avoided.

To prevent the plates of the machine press from "sticking" to sheet 10 and possibly damaging sheet 10, a layer of foil or other material can be positioned on one or both sides of sheet 10 prior to pressing. For example, sheet 10 can be sandwiched between two layers of aluminum foil. In some cases, the side of the aluminum foil that contacts sheet 10 can be coated with polytetrafluoroethylene or another low surface energy material to prevent sheet 10 from sticking to the aluminum foil during or after pressing. Additionally, one or both of the plates can include a surface pattern that has one or more protrusions or recesses to provide greater or lesser pressure application at various locations of sheet 10. The surface pattern(s) allow for localized areas of varying resistivity on sheet 10. Sheet 10 then can be used in applications where varying resistivity of a heating element is desirable.

Heat energy can also be applied to sheet 10 before, during or after the application of pressure to sheet 10. The application of heat may further aid in the reduction of the size and/or number of air voids 14 present within sheet 10. One or both of the opposing plates of the machine press can be heated such that when the plates are pressed together, both pressure and heat energy is delivered to sheet 10. This pressure and heat energy are applied to sheet 10 essentially simultaneously. In some embodiments, the plates can be heated to a temperature of about 100° C. (212° F.). In theory, sheet 10 can be heated to a temperature as high as possible as long as air voids 14 are being reduced in size and/or number and significant damage to sheet 10 is avoided. In the case of heating sheet 10 before or after pressing, sheet 10 can be heated to a temperature within the above range.

In another embodiment, pressure is applied to sheet 10 using a set of nip rollers. Nip rollers are cylindrical rollers through which sheet 10 is fed. The outer diameter surfaces of two nip rollers are separated by a distance that is less than the thickness of sheet 10. The distances between the outer diameter surfaces of the nip rollers can vary along the interfacing length of the nip rollers. As sheet 10 passes between the two nip rollers, pressure is applied by the nip rollers to sheet 10. The pressures disclosed above with respect to the machine press can also be applied by a set of nip rollers. A set of nip rollers includes two or more rollers through which sheet 10 passes. The set of nip rollers can be heated in a fashion similar to the plates of a machine press to add heat energy at the time pressure is applied to sheet 10.

In another embodiment, an autoclave is used to apply pressure to sheet 10. Sheet 10 is positioned within the pressure chamber of an autoclave and sheet 10 is subjected to elevated pressure and temperature within the autoclave. The pressures and temperatures disclosed above with respect to the machine press can also be applied by an autoclave.

The methods of pressure application disclosed above describe the application of pressure to a pure CNT-NSM, such as CNT nonwoven sheet 10. The same methods can also be applied to a CNT nonwoven sheet that includes a backing material. The CNT nonwoven sheet can be layered on top of or beneath a backing material layer or sheet. The combined CNT nonwoven sheet and backing material can then be pressed using a machine press or set of nip rollers or positioned in an autoclave for pressure application. Alternatively, the backing material can be attached to a CNT nonwoven sheet by an adhesive or resin and then pressed or autoclaved. Suitable backing materials include glass fibers and pre-pregs (e.g., composite fibers in an epoxy matrix).

The following example provides a non-limiting demonstration of the process that is the subject of this disclosure. As discussed above other processes and other processing conditions can be used to obtain the benefits of the process that is the subject of this disclosure.

Example

Figure 2:
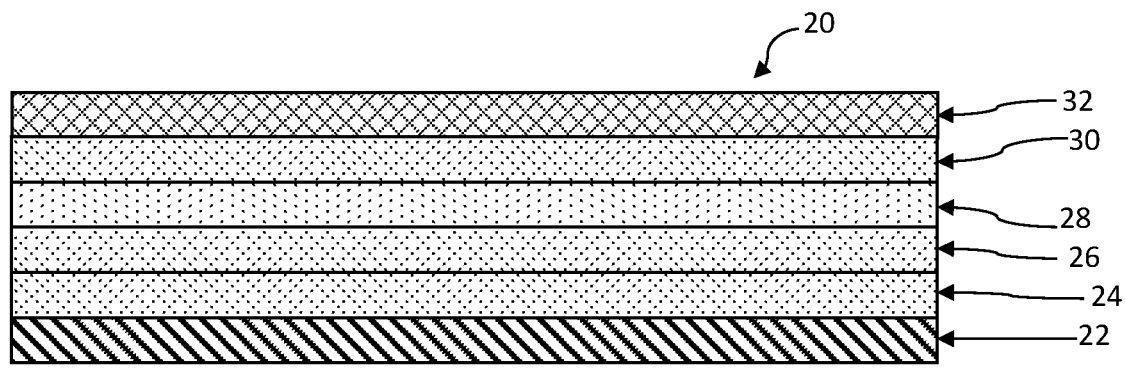
FIG. 2 is a schematic view of an embodiment of a carbon nanotube nonwoven sheet material (CNT-NSM) consistent with the Example.

Three test samples were prepared in accordance with the structure shown in FIG. 2. Each sample 20 had a base layer 22 of aluminum (to represent the skin of an aircraft part) onto which were applied a first layer 24 and a second layer 26 of film adhesive. A CNT nonwoven sheet 28 (Miralon® CNT nonwoven sheet produced by Nancomp Technologies, Inc./Huntsman Advanced Materials of Merrimack, N.H.) was placed on top of the second layer 26 of film adhesive. The third layer 30 of film adhesive was place on top of the CNT nonwoven sheet 28. Glass fiber backing layer 32 was place on top of the third layer 30 of film adhesive. The samples 20 were intended to mimic the structure of aircraft anti-icing and de-icing devices that include CNT nonwoven sheets 28.

Table 1 provides additional information about the materials used to prepare the samples:

TABLE 1

| Layer | Sample 1 | Sample 2 | Sample 3 |
| --- | --- | --- | --- |
| 22 | Aluminum sheet, 1.016 mm (0.040 inch) thick | Aluminum sheet, 1.016 mm (0.040 inch) thick | Aluminum sheet, 1.016 mm (0.040 inch) thick |
| 24 | Film adhesive 0.127 mm (0.005 inch) thick | Film adhesive 0.127 mm (0.005 inch) thick | Film adhesive 0.127 mm (0.005 inch) thick |
| 26 | Film adhesive 0.127 mm (0.005 inch) thick | Film adhesive 0.127 mm (0.005 inch) thick | Film adhesive 0.127 mm (0.005 inch) thick |
| 28 | Miralon ® CNT nonwoven sheet, areal density = 10 g/m$^{-2}$-15 g/m$^{-2}$ | Miralon ® CNT nonwoven sheet, areal density = 15 g/m$^{-2}$-20 g/m$^{-2}$ | Miralon ® CNT nonwoven sheet, areal density = 20 g/m$^{-2}$ - 30 g/m$^{-2}$ |
| 30 | Film adhesive 0.127 mm (0.005 inch) thick | Film adhesive 0.127 mm (0.005 inch) thick | Film adhesive 0.127 mm (0.005 inch) thick |
| 32 | Glass fiber backing layer. | Glass fiber backing layer. | Glass fiber backing layer. |

After each sample was prepared, the sheet resistivity was measured to provide an initial sheet resistivity metric. Each sample was then placed into an autoclave (make, model if you have it) and subjected to the temperature and pressure schedule shown in Table 2 to remove voids from the CNT nonwoven sheet. Following consolidation in the autoclave, the sheet resistivity was measured again to provide a final sheet resistivity metric. Both the initial sheet resistivity and final sheet resistivity were determined using a four point probe resistivity technique that is well known in the art.

TABLE 2

| Action | Action Time minutes | Cumulative Time minutes | Temperature ° C. (° F.) | Pressure, gauge kPa (psig) |
| --- | --- | --- | --- | --- |
| Start | 0 | 0 | 27 (80) | 0 |
| Ramp | 30 | 30 | 107 (225) | 517 (75) |
| Hold | 60 | 90 | 107 (225) | 517 (75) |
| Ramp | 30 | 120 | 177 (350) | 517 (75) |
| Hold | 120 | 240 | 177 (350) | 517 (75) |

TABLE 2-continued

| Action | Action Time minutes | Cumulative Time minutes | Temperature ° C. (° F.) | Pressure, gauge kPa (psig) |
|---|---|---|---|---|
| Ramp End | 90 | 330 | 27 (80) | 0 |

TABLE 3

| Sample | Initial Sheet Resistivity (ohms per square) | Final Sheet Resistivity (ohms per square) | Change in Resistivity Due to Consolidation Process |
|---|---|---|---|
| 1 | 1.15 | 0.624 | −45.7% |
| 2 | 1.45 | 0.544 | −62.5% |
| 3 | 0.65 | 0.180 | −72.4% |

As shown in table 3, applying a combination of heat and pressure to each of the samples reduced sheet resistivity by 45% to 72%. Although the Example is based on an embodiment of a CNT nonwoven sheet in combination with an aluminum sheet, adhesive layers, and a glass fiber backing layer, it is expected that the equivalent sheet resistivity reduction will be obtained with any other embodiment described in this disclosure due to consolidation of air voids and alignment of carbon nanotubes in the CNT nonwoven sheet. Decreasing sheet resistivity to the extent demonstrated in this example, makes CNT nonwoven sheets suitable for use in aircraft anti-icing and de-icing applications While the instant disclosure refers particularly to carbon nanotubes, it is theorized that the resistivity of sheets containing other electrically conductive carbon allotropes (e.g., graphene nanoribbons) would behave in a similar fashion. Embodiments containing other suitable carbon allotropes are within the scope of the instant disclosure.

The methods disclosed herein provide means for reducing the resistivity of CNT-NSMs without increasing their mass or the chemical processes needed to add resistivity-reducing functional groups to the carbon backbone of the CNT materials. The disclosure allows commercially available CNT-NSMs to be useful for aerospace and aircraft anti-icing and de-icing applications.

DISCUSSION OF POSSIBLE EMBODIMENTS

The following are non-exclusive descriptions of possible embodiments of the present invention.

A method for reducing the resistivity of a carbon nanotube nonwoven sheet can include providing a carbon nanotube nonwoven sheet comprising a plurality of carbon nanotubes and applying pressure to the carbon nanotube nonwoven sheet to reduce air voids between carbon nanotubes within the carbon nanotube nonwoven sheet.

The method of the preceding paragraph can optionally include, additionally and/or alternatively, any one or more of the following features, configurations and/or additional components:

The method can further include heating the carbon nanotube nonwoven sheet.

The steps of applying pressure to the carbon nanotube nonwoven sheet and heating the carbon nanotube nonwoven sheet occur simultaneously.

The step of applying pressure to the carbon nanotube nonwoven sheet can be performed using a machine press.

The method can further include layering a foil on a side of the carbon nanotube nonwoven sheet prior to applying pressure to the carbon nanotube nonwoven sheet.

The foil can include aluminum and polytetrafluoroethylene.

The step of applying pressure to the carbon nanotube nonwoven sheet can be performed using a set of nip rollers.

The step of applying pressure to the carbon nanotube nonwoven sheet can be performed using an autoclave.

The carbon nanotube nonwoven sheet can include a plurality of carbon nanotubes held together by Van der Waals forces, and applying pressure to the carbon nanotube nonwoven sheet can reduce spacing between at least some adjacent carbon nanotubes.

The carbon nanotube nonwoven sheet can contain no adhesives or resins.

The carbon nanotube nonwoven sheet can be attached to a backing material.

The backing material can include glass fibers.

The backing material can include a pre-preg layer.

The carbon nanotube nonwoven sheet can consist essentially of carbon nanotubes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for reducing the resistivity of a carbon nanotube nonwoven sheet, the method comprising:
   providing a dry carbon nanotube nonwoven sheet comprising a plurality of carbon nanotubes, wherein the dry carbon nanotube nonwoven sheet does not contain adhesives, resins, and polymers and wherein the dry carbon nanotube nonwoven sheet includes air voids between carbon nanotubes within the carbon nanotube nonwoven sheet; and
   applying pressure of 75 psig or higher to the carbon nanotube nonwoven sheet to reduce the air voids between carbon nanotubes within the carbon nanotube nonwoven sheet; and
   heating the carbon nanotube nonwoven sheet,
   wherein the steps of applying pressure to the carbon nanotube nonwoven sheet and heating the carbon nanotube nonwoven sheet occur simultaneously such that the carbon nanotube nonwoven sheet has at least 45% decreased resistivity following application of pressure and heat compared to the resistivity of the carbon nanotube nonwoven sheet before application of pressure and heat.

2. The method of claim 1, wherein the step of applying pressure to the carbon nanotube nonwoven sheet is performed using a machine press.

3. The method of claim 2, further comprising:
   layering a foil on a side of the carbon nanotube nonwoven sheet prior to applying pressure to the carbon nanotube nonwoven sheet.

4. The method of claim 3, wherein the foil comprises aluminum and polytetrafluoroethylene.

5. The method of claim 1, wherein the step of applying pressure to the carbon nanotube nonwoven sheet is performed using a set of nip rollers.

6. The method of claim 1, wherein the step of applying pressure to the carbon nanotube nonwoven sheet is performed using an autoclave.

7. The method of claim 1, wherein the carbon nanotube nonwoven sheet comprises a plurality of carbon nanotubes held together by Van der Waals forces, and wherein applying pressure to the carbon nanotube nonwoven sheet reduces spacing between at least some adjacent carbon nanotubes.

8. The method of claim 1, wherein the carbon nanotube nonwoven sheet is attached to a backing material.

9. The method of claim 8, wherein the backing material comprises glass fibers.

10. The method of claim 8, wherein the backing material comprises a pre-preg layer.

11. The method of claim 1, wherein the carbon nanotube nonwoven sheet consists essentially of carbon nanotubes.

\* \* \* \* \*